Nov. 16, 1965 J. F. SWEENEY 3,217,995

TAPE BUFFER MEANS

Filed Oct. 8, 1962 2 Sheets-Sheet 1

INVENTOR.
JACK F. SWEENEY
BY
[signature]
ATTORNEY

Nov. 16, 1965 J. F. SWEENEY 3,217,995
TAPE BUFFER MEANS
Filed Oct. 8, 1962 2 Sheets-Sheet 2

INVENTOR.
JACK F. SWEENEY
BY Harvey G. Lowhurst
ATTORNEY 3,217,995

TAPE BUFFER MEANS

Jack F. Sweeney, Los Altos Hills, Calif., assignor, by mesne assignments, to Hewlett-Packard Company, Palo Alto, Calif., a corporation of California Filed Oct. 8, 1962, Ser. No. 228,805
11 Claims. (Cl. 242—55.12)

This invention relates generally to a tape buffer providing transitory storage and, more particularly, to a buffer means for a tape transport to dampen the longitudinal oscillations caused by subjecting the tape to sudden start operations.

For many types of tape transports, particularly magnetic tape transports employed with digital computers, it has been found desirable to provide an extremely fast start characteristic of the magnetic tape. The reason for such start and stop characteristics is that in order to make the most efficient use of the computing system, the magnetic tape must supply or receive information to or from the computer with the minimum possible time delay in order to minimize idle waiting time for the computer.

Magnetic tape transports capable of rapid starting operations are generally provided with some tape buffer means on either side of the magnetic head, usually spaced between the tape driving capstan and the associated tape storage reel. One suitable type of tape buffer means for taking up tape slack and for tensioning the tape during rapid acceleration and decelerations is the vacuum chamber. The tape enters the vacuum chamber and forms a flexible sidewall thereof and is therefore sucked into the same by the pressure differential to form a loop.

Since the tape is accelerated in the forward and reverse direction by tape driving capstans, the supply and take-up reels must follow along in such a way as to always maintain a loop in the tape storage means. For example, during forward wind the tape is pulled past the magnetic head from the supply reel and wound upon the take-up wheel. To maintain proper loops in both chambers, both reels are motorized, the supply wheel to release tape during the forward wind and the take-up reel to store tape during this operation.

Control of the motor operating each reel is usually provided by sensors in the vacuum chamber which speed up rotation when the loop becomes too long and slow down rotation when the loop becomes too short. Loop sensors may sense the length or position of the loop or the velocity of the tape, as is well known to those skilled in the art.

Tape speed is accurately controlled by a constantly rotating tape driving capstan against which the tape is pressed by means of a pinch roller. Often the outer surface of the capstan is made rough so that the tape more accurately follows the capstan. It has been found that when the pinch roller engages the tape against the rotating driving capstan, thereby very rapidly accelerating the tape, a longitudinally propagating velocity transient is generated in the elastic tape. This velocity transient, which increases with the roughness of the capstan surface, presents a serious limitation to the efficient operation of tape transport for digital recording, since it is almost impossible to provide accurate recording or reproducing during the period of oscillation caused by the velocity transient.

Even though the tape loop formed by the pressure differential in the vacuum type tape buffer means provides a certain degree of damping to the longitudinally propagating velocity transient, the buffer action has been found insufficient in case of very rapid starting accelerations. The velocity transient generated when the pinch roller suddenly clamps the tape to the rough surface of a driving capstan is insufficiently attenuated by the loop in the prior art vacuum chambers and causes severe and insufficiently damped longitudinal oscillations of objectionably large amplitudes during acceleration.

If recording or reproduction were to be attempted during the period of these oscillations, they would cause the bit-to-bit spacing to vary widely, making it very difficult if not impossible to use the resultant signal output.

It is therefore a primary object of this invention to provide a means for decreasing and damping the longitudinal oscillation produced in an elastic medium as it is suddenly being accelerated.

It is a further object of this invention to provide a tape transport in which the longitudinal velocity transient accompanying the sudden acceleration of the tape is more highly damped as has been possible heretofore.

It is another object of this invention to provide a tape transport in which the oscillations along the length of the tape when the tape is accelerated are minimized so that the magnetic head may, in a substantially shorter time, accurately record or read-out data from the magnetic tape.

It is another object of this invention to provide an improved tape transport in which the tape may be accelerated rapidly without objectionable velocity transients.

Other objects and a better understanding of the invention may be had by reference to the following description, taken in conjunction with the accompanying drawings, in which.

Figure 1:
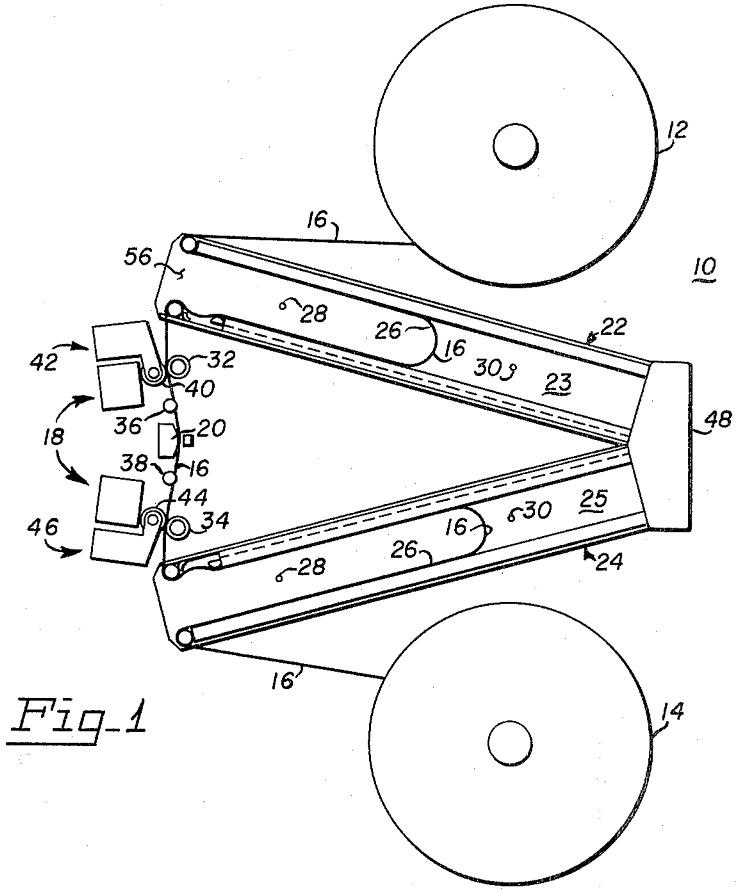
FIG. 1 is a schematic plan view of a tape transport incorporating the buffered tape storage means of this invention.

Referring now to the drawings, and particularly to FIG. 1 thereof, there is shown a tape transport generally designated as 10, including a pair of tape storage reels such as supply reel 12 and take-up reel 14 upon which a magnetic tape 16 is stored. Tape transport 10 further includes a tape driving means generally indicated as 18 for driving the tape in either direction, a tape transducer or sensor such as magnetic record and reproduce head 20, and a pair of tape buffer means 22 and 24 for providing transitory tensioned storage of tape 16 between supply reel 12 and tape driving means 18, and between tape driving means 18 and take-up reel 14, respectively.

Tape buffer means 22 and 24 are of the type generally referred to as vacuum chambers in which a portion of tape 16 is exposed to a pressure differential to form a loop 26 inside the pocket. The length of loop 26 is controlled by the torque supplied by the motors (not shown) rotating reels 12 and 14 in a manner well known to those skilled in the art. More particularly, each vacuum chamber is provided with a loop sensor means which senses, for example, the length of tape loop 26 and applies a signal which causes rotation of the motor of the adjacent storage reel to maintain the length of tape 26 within selected limits.

In vacuum chambers 22 and 24, the loop sensors are in the form of pressure sensitive transducers (not shown) which are connected to the chambers through small openings 28 and 30, these openings being respectively positioned to actuate corrective action when tape loop 26 becomes too short to include the first opening, or so long as to include both openings. When loop 26 becomes so short as to expose opening 28 to the low pressure in the chamber portion 23, the associated pressure sensor applies a signal to the storage reel motor to cause reel rotation to increase the loop length. When loop 26 becomes so long as to expose opening 30 to atmospheric pressure, the opposite action takes place to shorten loop 26.

Both vacuum chambers 22 and 24 are connected to a low pressure system shown diagrammatically at 48 which maintains the chamber portions 23 and 25 and side tape loop 26 at a selected low pressure. Accordingly, the length of loop 26 in vacuum chambers 22 and 24 is controlled by the limiting positions of openings 28 and 30 in a manner well known in the art. The above described loop length control forms no part of this invention and may take other well known forms such as proportional loop length control and the like.

Tape driving means 18 provides for selectively moving tape 16 in either direction at a carefully controlled, uniform speed, past magnetic head 20. Tape driving means 18 comprises a tape driving capstan 32 for reverse drive (assuming that the forward tape drive is downwards) and a tape driving capstan 34 for forward drive. Between driving capstans 32 and 34 and magnetic head 20 are tape guides 36 and 38, respectively. Tape 16 is engaged to reverse driving capstan 32 by a reverse pinch roller 40 connected to a pinch roller actuator 42 to drive the tape in the reverse direction. Similarly, tape 16 is engaged to forward driving capstan 34 by forward pinch roller 44 connected to a forward pinch roller actuator 46 to drive the tape in the forward direction.

Tape guides 36 and 38 may be spring loaded edge guides having slots which are communicated with a low pressure system for vacuum cleaning the tape as it passes to or from magnetic head 20.

Figure 3:
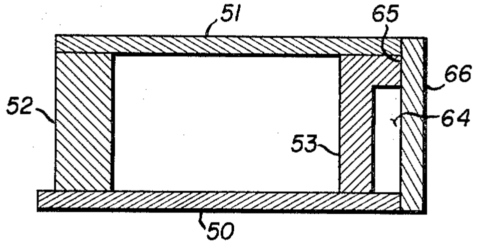
FIG. 3 is an enlarged sectional view taken along line 3—3 of FIG. 2.
Figures 2, 4A:
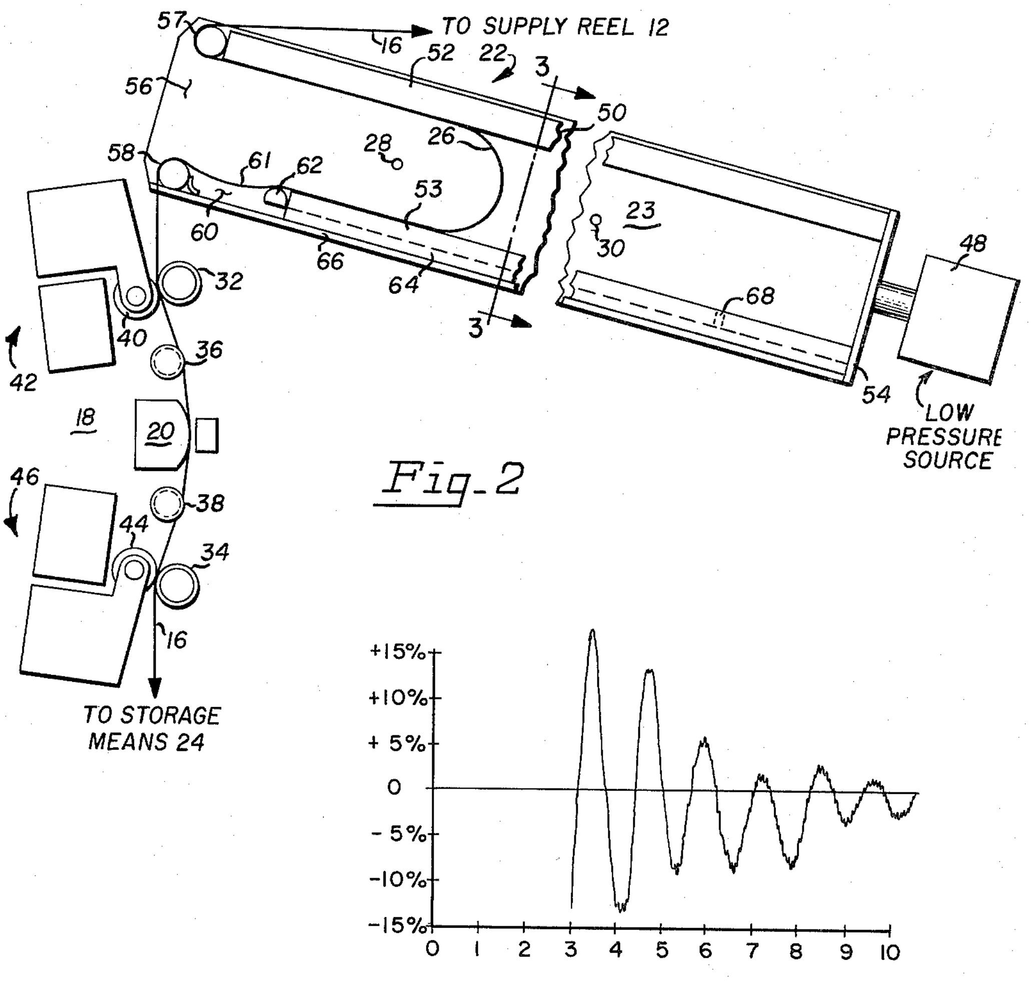
FIG. 2 is an enlarged view of a portion of the tape transport of FIG. 1 showing details of one of the buffered tape storage means of this invention.
FIGS. 4A and 4B are graphs showing the variation of tape speed during the first ten milliseconds after accelerating the tape for a tape transport respectively with and without a buffered tape storage means in accordance with this invention.

Referring now particularly to FIGS. 2 and 3 there is shown an enlarged view of vacuum chamber 22 and the portion of tape 16 between chamber 22 and forward driving capstan 34. Vacuum chamber 22 comprises, generally, a pair of spaced parallel body plates 50, 51 forming the bottom and top of vacuum chamber 22, a pair of side plates 52 and 53 pressure tightly sealed to top and bottom body plates 50, and an end plate 54 pressure tightly sealed to body plates 50 and 51 and to side plates 52, 53. Side plate 52 extends substantially all along the length of vacuum chamber 22 to the entrance portion 56 of storage means 22, which entrance portion is defined as the space between tape guide posts 57 and 58. Side plate 53 is shorter than side plate 52 and terminates in such a way as to provide an open space 60 of selected length between exit post 58 and a guide post 62 immediately adjacent the terminated end of side plate 53. Post 62 is spaced sufficiently close to plate 53 to form a pressure tight seal therewith.

Side plate 53 is provided with a longitudinal channel or slot 64, as best seen in FIG. 3, along its outer surface 65 which is closed by an outer side plate 66 pressure tightly sealed to body plates 50 and 51. Channel 64 is communicated with low pressure region 23 of vacuum chamber 22 by means of a duct 68 located near end plate 54 so as not to be obstructed by tape loop 26. As will be explained hereinafter, the diameter of duct 68 is selected to produce a desired pressure drop (higher pressure in channel 64) between channel 64 and the pressure in pocket portion 23.

One end portion of channel 64 opens into open space 60 adjacent to post 62 and the other end portion is closed by end plate 54. Also, outer side plate 50 extends from end plate 54 all the way to post 58 and is in pressure tight communication therewith so that open space 60 is in pressure sealed communication with channel 64.

Body plates 50 and 51 are spaced to admit tape 16 into chamber 22, i.e., they are spaced sufficiently far apart to allow tape 16 to move freely in chamber 22 perpendicularly to its plane. On the other hand, plates 50 and 51 are sufficiently closely spaced to one another so that opposite edges of tape 16 are effectively sealed to their opposite surfaces. For a tape having a width of one-half inch a clearance of 3 to 8 thousandths of an inch has been found eminently satisfactory.

Accordingly, vacuum chamber 22 includes first low pressure chamber portion 23 which loops tape 16 and maintains loop 26 at a selected length or between a minimum and maximum length, by means of the torques exerted by the storage reels controlled by sensors, and a second low pressure chamber portion 60 maintained at a pressure higher than the first low pressure chamber portion. The second low pressure chamber portion may also be referred to as the intermediate pressure chamber portion and is located immediately adjacent exit tape guide 58. The pull on the tape overlying opening 60 causes the formation of a curved tape portion 61, the degree of curvature depending on the force exerted thereon by the differential pressure thereacross. Therefore, both the length of opening 60 as well as the pressure of opening 60 are adjusted to provide the desired curvature.

In the operation of tape transport 10, curved loop portion 61 formed between guide posts 58 and 62 provides a very important damping function when tape 16 is suddenly clamped against driving capstan 34 by pinch roller 44. As is well known to those skilled in the art, in tape transports used for digital recording, both driving capstans 32 and 34 are constantly rotating at a carefully controlled constant speed and tape 16 is moved either in the forward or reverse direction by the sudden actuation of either pinch roller 40 or 44.

When tape 16 is accelerated in such a manner to its proper speed in less than 2 milliseconds, a longitudinal shock wave or velocity transient is generated which travels along tape 16 through chamber 22 and is partially reflected by entrance guide post 57. Since tape 16 is an elastic medium, this shock wave results in oscillations about the desired tape speeds. The frequency and amplitude of these oscillations appear to depend on the distance between capstan drive 34 and entrance guide post 57 of vacuum guide 22 as well as on the tension on tape 16 applied by loop 26 and width of tape 16, and elasticity of tape.

For conventional vacuum chambers, that is chambers having only a conventional low pressure chamber portion 23, and no intermediate pressure chamber portion 60, the tape velocity variation at the magnetic sensing device 20 is shown by the graph of FIG. 4A. The horizontal axis of FIG. 4A designates time in milliseconds after initiation of the start command to move the tape. The vertical axis of FIG. 4A designates the percentage variation of tape speed from normal tape speed. As can be seen from the graph of FIG. 4A, there are violent oscillations about the normal speed which, even after the fifth millisecond, still have an amplitude of more than 13% of the normal speed and which thereafter decay slowly.

Providing an intermediate pressure chamber portion 60 immediately adjacent entrance guide post 58 produces a slightly curved loop section 61 which provides a buffer action giving much improved performance. One explanation for this improved performance is that the loop portion 61 provides tape for the initial acceleration, transferring the initial sharp change in longitudinal tension in a relatively gradual manner to the tape comprising loop 26, thereby absorbing the initial starting shock and providing a substantial damping of the oscillation. This action may be considered analogous to the proper termination of an electrical transmission line, which is well known in the communications art as the method of preventing unwanted reflections.

Figure 4B:
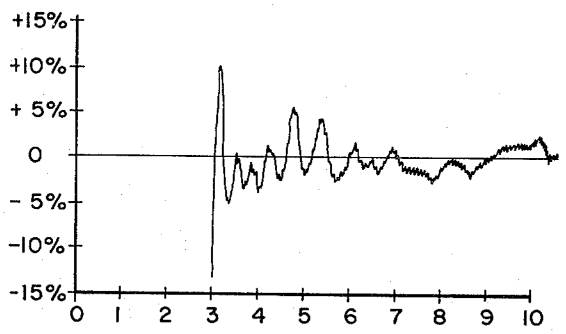

The effect of damping the transient caused by the acceleration characteristic is best shown in the graph of FIG. 4B in which the horizontal and the vertical axis represent the same quantities and to the same scale as indicated in connection with the description of FIG. 4A.

As is immediately evident from an inspection of the graph, the speed variation after the third millisecond is approximately within 5% of nominal speed and amplitude decay thereafter is quite rapid.

Both graphs shown in FIGS. 4A and 4B were experimentally obtained from a vacuum chamber about 1¾ inches wide and 14 inches long. The low pressure chamber region 23 was maintained at about 20 inches of water. The graph of FIG. 4B was taken with the same vacuum chamber having been provided with an intermediate pressure chamber portion 60 of a length of about 1⁵⁄₁₆ inch located immediately adjacent entrance guide post 58 and maintained at an intermediate pressure of about 15 inches of water.

The optimum length of intermediate pressure chamber opening 60 has been found to be related to the length of the portion of tape 16 between entrance guide post 57 and driving capstan 38 and is adjusted to provide maximum damping. Furthermore, since the intermediate pressure in pressure chamber portion 60 together with the length of opening 60 determines the curvature of loop 61 the intermediate pressure itself provides a parameter requiring optimization for any particular system. Accordingly, there are two parameters, namely the intermediate pressure and the length of opening 60, which determine the curvature of loop 61 and thereby the degree of damping provided.

There has been described a tape buffer means for transitory tape storage which provides improved speed control for the tape during rapid start operations. The tape buffer means includes, in addition to the conventional low pressure chamber region forming the loop, an intermediate pressure chamber region immediately adjacent the entrance of the chamber which absorbs the initial starting shock. This invention, even though described in connection with a magnetic tape transport, may be incorporated into any type of transport for accelerating a strip-like medium. For example, instead of magnetic tape the strip to be accelerated may be photographic film, or paper tape; and the transport may be a film projector or a paper tape recorder.

What is claimed is:

1. A tape transport comprising:
a pair of tape storage means;
tape drive means intermediate said tape storage means for driving the tape past a stationary tape utilization means; and
a vacuum chamber tape buffer means between said tape drive means and at least one of said storage means, said tape buffer means including a low pressure region for forming a tape loop and an intermediate constant pressure region, a portion of said tape loop completely overlying said intermediate constant pressure region and being deformed under the force of the intermediate constant pressure into a curved portion.

2. A tape transport comprising:
a pair of tape storage means;
tape driving means between said tape storage means for driving tape past a sensing means; and
vacuum tape buffer means disposed to intercept a portion of tape between said tape driving means and at least one of said tape storage means, said tape buffer means including an elongated vacuum chamber with opposite side walls having one end portion maintained at a selected vacuum pressure for deforming the tape into an inwardly extending loop having side portions lying flat against said side walls and a curved end portion connecting said side portions, and an opening in one of said side walls and disposed adjacent the other end portion of said vacuum chamber, said opening forming a further vacuum chamber maintained at a selected further vacuum pressure which is intermediate between said selected vacuum pressure and atmospheric pressure for curving the overlying tape portion.

3. A tape transport particularly suitable for rapidly accelerating a tape to normal speed and for minimizing the velocity transient generated by the rapid acceleration comprising:
a pair of tape storage reels;
tape driving means between said tape storage reels for driving the tape past a tape sensing means in either direction; and
tape buffer means between said tape driving means and each tape storage reel into which a selected length of tape is looped for transitory storage, said tape buffer means including an elongated channel of substantially rectangular cross section and a pair of side walls, one end of said elongated channel being closed and maintained at a first selected vacuum pressure and the other end of said elongated channel being open to form a tape entrance portion, one of said side walls being formed with an aperture dimensioned to accommodate the width of said tape and terminating immediately adjacent said entrance portion, said aperture being communicated with a region maintained at a second selected vacuum pressure which is intermediate between said first vacuum pressure and atmospheric pressure.

4. A tape transport comprising:
a motorized tape storage reel;
a tape utilization means;
tape driving means for selectively engaging the tape from said tape storage reel for driving the tape past said tape utilization means;
tape buffer means for accommodating tape between said tape storage reel and said tape utilization means, said tape buffer means being formed of an elongated channel of substantially rectangular cross sections having one end maintained at a first selected negative pressure and the other end open for reception of the tape, said elongated channel having a top and bottom wall and a pair of side walls, said top and bottom walls being spaced so that the tape may freely slide into said channel with opposite edges in sufficiently close proximity with adjacent top and bottom walls to provide a pressure seal, and an opening in one of said side walls immediately adjacent the open end of said channel and extending between said top and bottom wall and having a selected width, said opening being maintained at a second selected negative pressure; and
sensing means for sensing the length of tape accommodated within said tape buffer means, said sensing means controlling the winding torque of said motorized tape storage reel in such a manner that the length of tape within said tape buffer means does not exceed a selected maximum or falls below a selected minimum, said selected minimum being sufficiently long to completely cover said opening in said side wall.

5. A tape transport comprising:
a pair of tape reels;
capstan means between said tape reels for driving tape in either direction with rapid stop and start operation past a magnetic head;
a pair of vacuum chambers, each vacuum chamber storing a portion of the tape extending between a reel and said capstan means in the form of a loop and including means for maintaining the length of said loop within selected minimum and maximum limits, each of said vacuum chambers having side walls and an opening dimensioned for receiving tape in one of said side walls immediately adjacent the entrance portion thereof which is closest to said capstan means; and
a vacuum pocket communicating with said opening, said vacuum pocket being maintained at a pressure selected to minimize longitudinal reflections generated along the tape upon sudden engagement with said capstan means.

6. In a vacuum chamber for tensioning a looped section of tape which is movable by a capstan means from a tape supply reel across a magnetic head and for controlling the winding torque on said tape supply reel in accordance with the length of said looped section within said vacuum chamber, the improvement comprising:

a further vacuum chamber having an opening communicating with the side wall of said vacuum chamber from which tape moves towards said head and immediately adjacent the exit portion thereof, and means for maintaining said further vacuum chamber, and therefore the overlying tape, at a substantially constant pressure selected to provide maximum damping of the longitudinal oscillations along the tape generated when said capstan means suddenly engages the tape.

7. A vacuum chamber in accordance with claim 6 in which said opening is substantially rectangular and has a width dimensioned to permit lateral motion of the tape therein and a length selected in accordance with the length of tape between the entrance portion of said vacuum chamber and the driving capstan of said capstan means.

8. A chamber for tensioning tape between a tape storage reel and a capstan means, said chamber comprising:

an elongated hollow channel of substantially rectangular cross section including parallel top and bottom walls spaced to receive the tape so that the surface of the tape is perpendicular to said top and bottom wall and further including opposite side walls, said channel having first and second end portions;

a low pressure system connected to said first end portion, a tape received by said second end portion being urged towards said first end portion by the suction of said low pressure system;

a tape guide means associated with each side wall and forming the extremities thereof at said second end portion to guide the tape from said storage reel into said channel and guide the tape out of said channel to said capstan means;

an opening in the side wall of said channel from which tape is supplied to said capstan means, said opening extending between said top and bottom walls and having a length selected in accordance with the length between the opposite tape guide means and said capstan means; and means for pressurizing said opening with a pressure intermediate the pressure maintained by said low pressure system and atmospheric pressure.

9. A chamber in accordance with claim 8 in which said opening is substantially rectangular and in which said means for pressurizing said opening comprises an enclosure and a communication duct for connecting said enclosure to said first end portion, said duct being dimensioned to provide a selected pressure drop therealong so that the pressure in said enclosure follows a pressure in said first end portion but is always more positive by an amount proportional to the pressure drop along said duct.

10. A chamber in accordance with claim 9 in which means are provided to control the length of the loop formed within said channel between selected limits and in which the minimum loop length is substantially greater than the width of said opening so that during normal operation the tape completely overlies said opening.

11. A tape transport in accordance with claim 4 in which said second negative pressure and the width of said opening are selected to provide maximum damping of the longitudinal oscillations set up when said driving means suddenly engages the tape.

References Cited by the Examiner

UNITED STATES PATENTS

| | | | |
|---|---|---|---|
| 2,952,010 | 9/1960 | Demer et al. | 242—55.12 X |
| 2,994,489 | 8/1961 | Hare | 242—75.2 |
| 3,065,892 | 11/1962 | Castelijns | 226—97 |
| 3,148,816 | 9/1964 | Martin et al. | 242—55.12 X |
| 3,176,894 | 4/1965 | Schoeneman | 226—118 |

FOREIGN PATENTS

| | | |
|---|---|---|
| 847,821 | 9/1960 | Great Britain. |

OTHER REFERENCES

IBM Technical Bulletin; vol. 2, No. 2; page 8; August 1959.

MERVIN STEIN, *Primary Examiner.*

RUSSELL C. MADER, DONALD W. PARKER, *Examiners.*